United States Patent
Dick et al.

(10) Patent No.: US 12,501,219 B2
(45) Date of Patent: Dec. 16, 2025

(54) DUAL-LENS IMAGE CAPTURE DEVICE MICROPHONE POSITIONING

(71) Applicant: GoPro, Inc., San Mateo, CA (US)

(72) Inventors: Timothy Dick, San Francisco, CA (US); Erich Tisch, San Francisco, CA (US); Akshay Shinde, Foster City, CA (US)

(73) Assignee: GoPro, Inc., San Mateo, CA (US)

( * ) Notice: Subject to any disclaimer, the term of this patent is extended or adjusted under 35 U.S.C. 154(b) by 230 days.

(21) Appl. No.: 18/204,627

(22) Filed: Jun. 1, 2023

(65) Prior Publication Data

US 2024/0406631 A1 Dec. 5, 2024

(51) Int. Cl.
*H04R 5/027* (2006.01)
*H04N 23/90* (2023.01)
*H04R 1/02* (2006.01)

(52) U.S. Cl.
CPC ............ *H04R 5/027* (2013.01); *H04N 23/90* (2023.01); *H04R 1/028* (2013.01); *H04R 2499/11* (2013.01)

(58) Field of Classification Search
CPC ........ H04N 23/90; H04N 23/45; H04R 1/028; H04R 5/027; H04R 2499/11; H04R 1/406; H04R 3/005
See application file for complete search history.

(56) References Cited

U.S. PATENT DOCUMENTS

| | | | |
|---|---|---|---|
| 9,432,768 B1 | 8/2016 | Cornelius | |
| 9,807,501 B1 | 10/2017 | Tisch | |
| 10,966,017 B2 | 3/2021 | Hardin | |
| 11,611,824 B2 | 3/2023 | Hardin | |
| 2010/0110232 A1 | 5/2010 | Zhang | |
| 2011/0317041 A1 | 12/2011 | Zurek | |
| 2012/0128175 A1 | 5/2012 | Erik | |
| 2014/0105416 A1 | 4/2014 | Huttunen | |
| 2014/0362253 A1 | 12/2014 | Kim | |
| 2015/0125011 A1 | 5/2015 | Sekiya | |
| 2016/0044410 A1 | 2/2016 | Mäkinen | |
| 2016/0071526 A1 | 3/2016 | Wingate | |
| 2016/0182799 A1 | 6/2016 | Laaksonen | |
| 2017/0034617 A1* | 2/2017 | Smith | H04R 1/222 |
| 2017/0055072 A1 | 2/2017 | Kim | |
| 2018/0227665 A1 | 8/2018 | Elko | |
| 2018/0343517 A1 | 11/2018 | Usher | |
| 2019/0020818 A1 | 1/2019 | Takada | |
| 2019/0246203 A1 | 8/2019 | Elko | |
| 2019/0342495 A1 | 11/2019 | Kaga | |

(Continued)

*Primary Examiner* — Marly S Camargo
(74) *Attorney, Agent, or Firm* — Young Basile Hanlon & MacFarlane, P.C.

(57) ABSTRACT

Microphones are disposed on different surfaces of an image capture device to generate different microphone capture patterns. A microphone with three microphone elements is disposed on the top surface of the image capture device. The three microphone elements are arranged in an equilateral triangular configuration. A second microphone with at least two microphone elements is disposed on the front surface of the image capture device. The at least two microphone elements are disposed on the front surface of the image capture device in a vertical configuration. A third microphone with at least one microphone element is disposed on a back surface of the image capture device.

20 Claims, 12 Drawing Sheets

(56) References Cited

U.S. PATENT DOCUMENTS

| | | |
|---|---|---|
| 2020/0015007 A1 | 1/2020 | Matsuura |
| 2020/0221219 A1 | 7/2020 | Hardin |
| 2021/0219049 A1 | 7/2021 | Hardin |
| 2024/0406652 A1* | 12/2024 | Mesiwala ............... H04S 3/008 |
| 2025/0225971 A1* | 7/2025 | Vondersaar ............ H04R 5/033 |

* cited by examiner

DUAL-LENS IMAGE CAPTURE DEVICE MICROPHONE POSITIONING

TECHNICAL FIELD

This disclosure relates to microphone positioning and audio capture patterns for electronic devices.

BACKGROUND

Dual-lens image capture devices are used to simultaneously record a scene from a first-person perspective using a forward-facing lens and of the user using a rear-facing lens. Images from the dual lenses may be stitched together to create a spherical image. Typically, one audio stream is recorded. The audio may be sufficient for the forward-facing lens, however it may be insufficient for the rear-facing lens, for example when the user is narrating the scene being captured.

SUMMARY

Disclosed herein are implementations of an image capture apparatus and methods for generating microphone capture patterns. In an aspect, an image capture apparatus may include a first image sensor, a second image sensor, a microphone array, and a processor. The first image sensor may be disposed on a first surface facing a first direction. The first image sensor may have a first field-of-view (FOV). The first image sensor may be configured to obtain first image data. The second image sensor may be disposed on a second surface facing a second direction that differs from the first direction. The second image sensor may have a second FOV that partially overlaps with the first FOV. The second image sensor may be configured to obtain second image data. The microphone array may include a first microphone and a second microphone. The first microphone may be facing the first direction. The first microphone may be disposed on a same side of the first surface as the first image sensor. The first microphone may include two microphone elements disposed in a vertical configuration on the same side of the first surface relative to the first image sensor. The second microphone may be facing a third direction that is perpendicular to the first and second directions. The second microphone may include a first microphone element, a second microphone element, and a third microphone element disposed in an equilateral triangular configuration. The processor may be configured to generate a stereo microphone capture pattern using the second microphone.

In an aspect, an image capture apparatus may include a first image sensor, a second image sensor, a microphone array, and a processor. The first image sensor may be disposed on a first surface facing a first direction. The first image sensor may have a first FOV. The first image sensor may be configured to obtain first image data. The second image sensor may be disposed on a second surface facing a second direction that differs from the first direction. The second image sensor may have a second FOV that partially overlaps with the first FOV. The second image sensor may be configured to obtain second image data. The microphone array may include a first microphone and a second microphone. The first microphone may be facing the first direction. The first microphone may be disposed on a same side of the first surface as the first image sensor. The first microphone may include two microphone elements disposed in a vertical configuration on the same side of the first surface relative to the first image sensor. The second microphone may be facing a third direction that is perpendicular to the first and second directions. The second microphone may include a first microphone element, a second microphone element, and a third microphone element disposed in an equilateral triangular configuration. The processor may be configured to generate a 360-degree microphone capture pattern using the first microphone and the second microphone.

In an aspect, a method may include obtaining first audio via a first microphone facing a first direction. The first microphone may be disposed on a first surface of a device. The first microphone may include two microphone elements disposed in a vertical configuration on the first surface of the device. The method may include obtaining second audio via a second microphone facing a second direction that is perpendicular to the first direction. The second microphone may include a first microphone element, a second microphone element, and a third microphone element disposed in an equilateral triangular configuration. The method may include generating a 360-degree microphone capture pattern using the first microphone and the second microphone.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

In the implementations described herein, microphone placements for dual-lens image capture devices are disclosed. The microphone placements are configured for supporting audio field of view, ambisonics creation, 360-degree direction of arrival estimation, wind noise reduction, and water drainage.

Figure 1A:
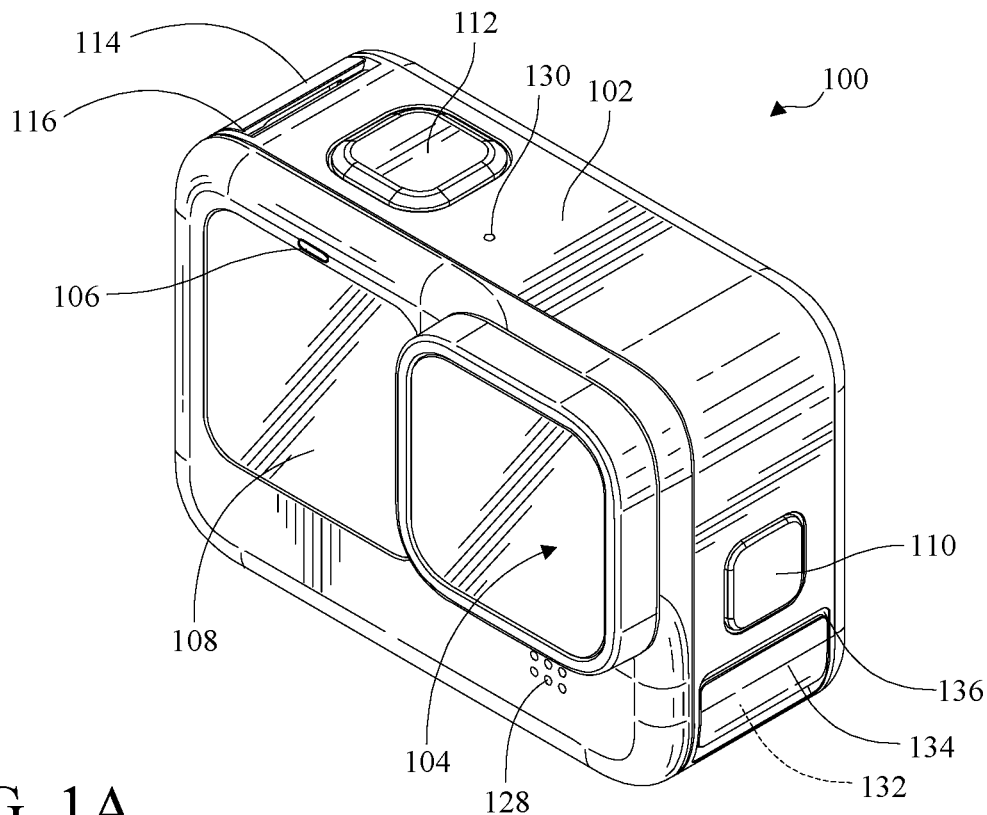
FIGS. 1A-B are isometric views of an example of an image capture apparatus.
Figure 1B:
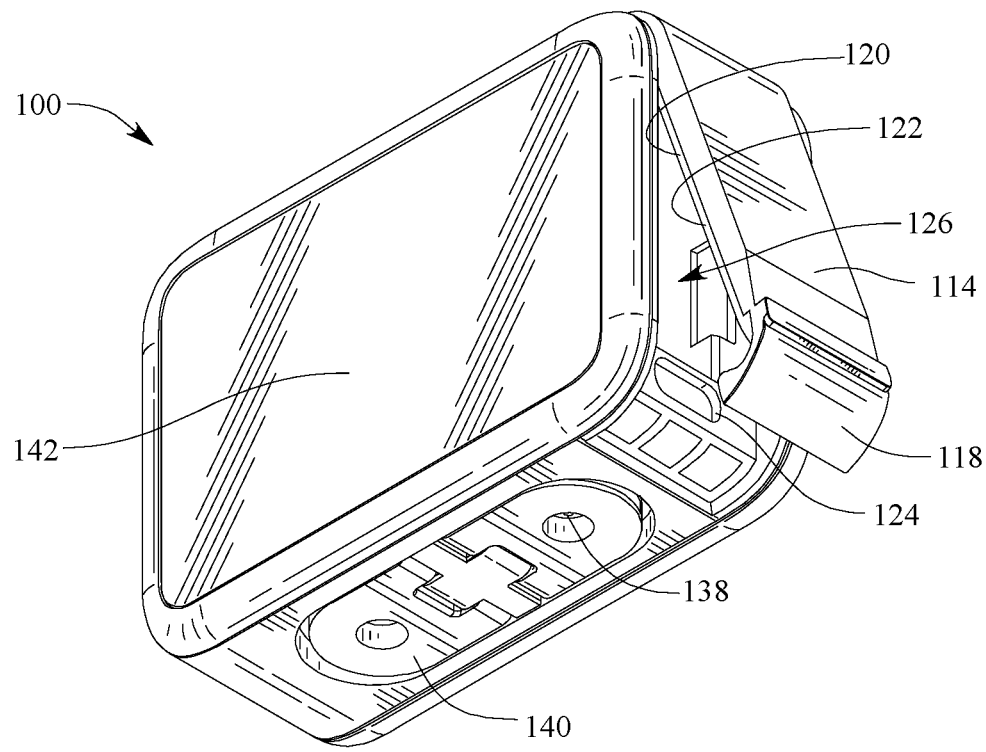
Figure 5:
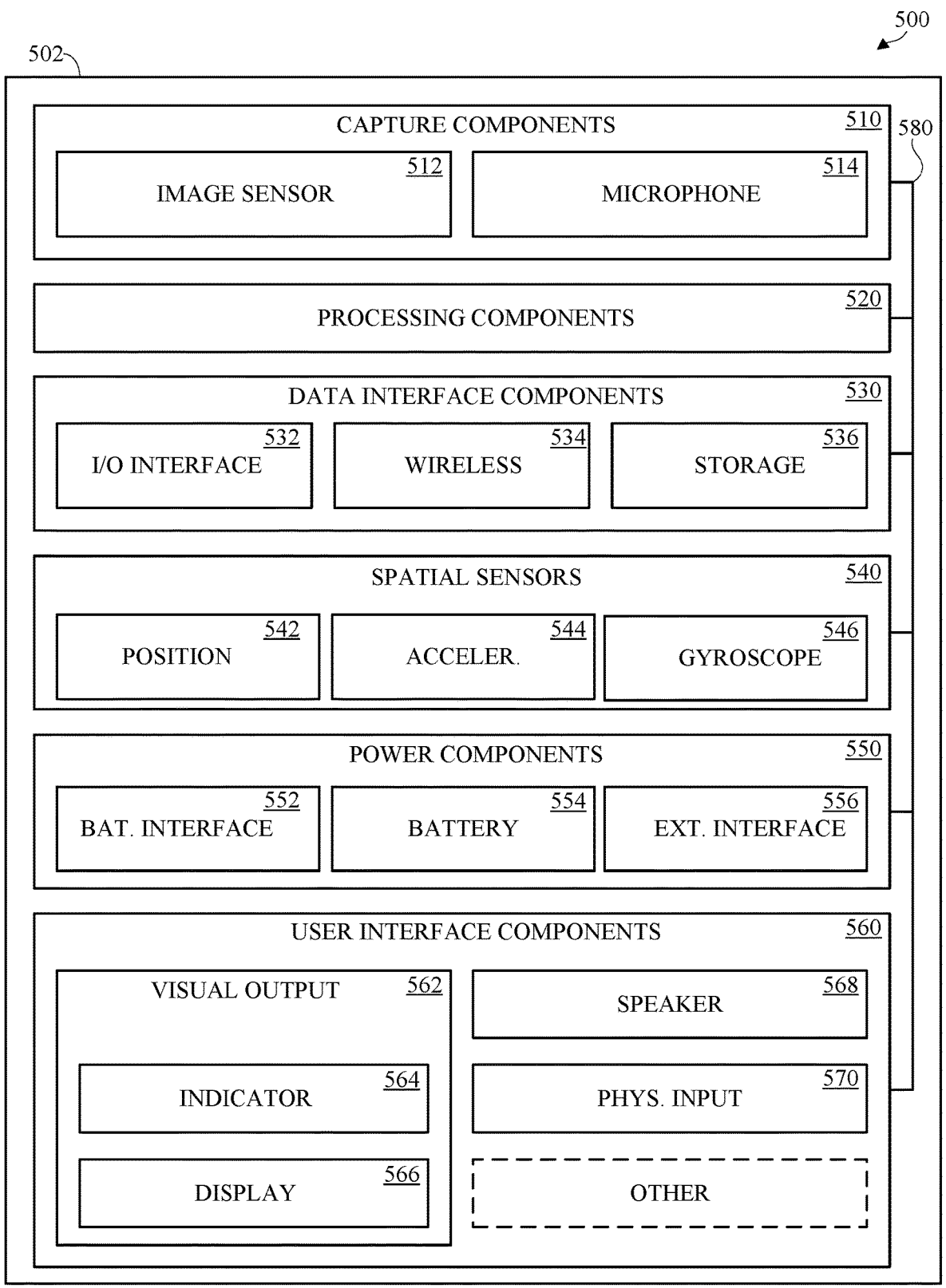
FIG. 5 is a block diagram of electronic components of an image capture apparatus.

FIGS. 1A-B are isometric views of an example of an image capture apparatus 100. The image capture apparatus 100 includes a body 102, an image capture device 104, an indicator 106, a display 108, a mode button 110, a shutter button 112, a door 114, a hinge mechanism 116, a latch mechanism 118, a seal 120, a battery interface 122, a data interface 124, a battery receptacle 126, microphones 128, 130, 132, a speaker 138, an interconnect mechanism 140, and a display 142. Although not expressly shown in FIGS. 1A-B, the image capture apparatus 100 includes internal electronics, such as imaging electronics, power electronics, and the like, internal to the body 102 for capturing images and performing other functions of the image capture apparatus 100. An example showing internal electronics is shown in FIG. 5. The arrangement of the components of the image capture apparatus 100 shown in FIGS. 1A-B is an example, other arrangements of elements may be used, except as is described herein or as is otherwise clear from context.

The body 102 of the image capture apparatus 100 may be made of a rigid material such as plastic, aluminum, steel, or fiberglass. Other materials may be used. The image capture device 104 is structured on a front surface of, and within, the body 102. The image capture device 104 includes a lens. The lens of the image capture device 104 receives light incident upon the lens of the image capture device 104 and directs the received light onto an image sensor of the image capture device 104 internal to the body 102. The image capture apparatus 100 may capture one or more images, such as a sequence of images, such as video. The image capture apparatus 100 may store the captured images and video for subsequent display, playback, or transfer to an external device. Although one image capture device 104 is shown in FIG. 1A, the image capture apparatus 100 may include multiple image capture devices, which may be structured on respective surfaces of the body 102.

As shown in FIG. 1A, the image capture apparatus 100 includes the indicator 106 structured on the front surface of the body 102. The indicator 106 may output, or emit, visible light, such as to indicate a status of the image capture apparatus 100. For example, the indicator 106 may be a light-emitting diode (LED). Although one indicator 106 is shown in FIG. 1A, the image capture apparatus 100 may include multiple indictors structured on respective surfaces of the body 102.

As shown in FIG. 1A, the image capture apparatus 100 includes the display 108 structured on the front surface of the body 102. The display 108 outputs, such as presents or displays, such as by emitting visible light, information, such as to show image information such as image previews, live video capture, or status information such as battery life, camera mode, elapsed time, and the like. In some implementations, the display 108 may be an interactive display, which may receive, detect, or capture input, such as user input representing user interaction with the image capture apparatus 100. In some implementations, the display 108 may be omitted or combined with another component of the image capture apparatus 100.

As shown in FIG. 1A, the image capture apparatus 100 includes the mode button 110 structured on a side surface of the body 102. Although described as a button, the mode button 110 may be another type of input device, such as a switch, a toggle, a slider, or a dial. Although one mode button 110 is shown in FIG. 1A, the image capture apparatus 100 may include multiple mode, or configuration, buttons structured on respective surfaces of the body 102. In some implementations, the mode button 110 may be omitted or combined with another component of the image capture apparatus 100. For example, the display 108 may be an interactive, such as touchscreen, display, and the mode button 110 may be physically omitted and functionally combined with the display 108.

As shown in FIG. 1A, the image capture apparatus 100 includes the shutter button 112 structured on a top surface of the body 102. The shutter button 112 may be another type of input device, such as a switch, a toggle, a slider, or a dial. The image capture apparatus 100 may include multiple shutter buttons structured on respective surfaces of the body 102. In some implementations, the shutter button 112 may be omitted or combined with another component of the image capture apparatus 100.

The mode button 110, the shutter button 112, or both, obtain input data, such as user input data in accordance with user interaction with the image capture apparatus 100. For example, the mode button 110, the shutter button 112, or both, may be used to turn the image capture apparatus 100 on and off, scroll through modes and settings, and select modes and change settings.

As shown in FIG. 1B, the image capture apparatus 100 includes the door 114 coupled to the body 102, such as using the hinge mechanism 116 (FIG. 1A). The door 114 may be secured to the body 102 using the latch mechanism 118 that releasably engages the body 102 at a position generally opposite the hinge mechanism 116. The door 114 includes the seal 120 and the battery interface 122. Although one door 114 is shown in FIG. 1A, the image capture apparatus 100 may include multiple doors respectively forming respective surfaces of the body 102, or portions thereof. The door 114 may be removable from the body 102 by releasing the latch mechanism 118 from the body 102 and decoupling the hinge mechanism 116 from the body 102.

In FIG. 1B, the door 114 is shown in a partially open position such that the data interface 124 is accessible for communicating with external devices and the battery receptacle 126 is accessible for placement or replacement of a battery. In FIG. 1A, the door 114 is shown in a closed position. In implementations in which the door 114 is in the closed position, the seal 120 engages a flange (not shown) to provide an environmental seal and the battery interface 122 engages the battery (not shown) to secure the battery in the battery receptacle 126.

As shown in FIG. 1B, the image capture apparatus 100 includes the battery receptacle 126 structured to form a portion of an interior surface of the body 102. The battery receptacle 126 includes operative connections for power transfer between the battery and the image capture apparatus 100. In some implementations, the battery receptable 126 may be omitted. The image capture apparatus 100 may include multiple battery receptacles.

As shown in FIG. 1A, the image capture apparatus 100 includes a first microphone 128 structured on a front surface of the body 102, a second microphone 130 structured on a top surface of the body 102, and a third microphone 132 structured on a side surface of the body 102. The third microphone 132, which may be referred to as a drain microphone and is indicated as hidden in dotted line, is located behind a drain cover 134, surrounded by a drain channel 136, and can drain liquid from audio components of the image capture apparatus 100. The image capture apparatus 100 may include other microphones on other surfaces of the body 102. The microphones 128, 130, 132 receive and record audio, such as in conjunction with capturing video or separate from capturing video. In some implementations, one or more of the microphones 128, 130, 132 may be omitted or combined with other components of the image capture apparatus 100.

As shown in FIG. 1B, the image capture apparatus 100 includes the speaker 138 structured on a bottom surface of the body 102. The speaker 138 outputs or presents audio, such as by playing back recorded audio or emitting sounds associated with notifications. The image capture apparatus 100 may include multiple speakers structured on respective surfaces of the body 102.

As shown in FIG. 1B, the image capture apparatus 100 includes the interconnect mechanism 140 structured on a bottom surface of the body 102. The interconnect mechanism 140 removably connects the image capture apparatus 100 to an external structure, such as a handle grip, another mount, or a securing device. The interconnect mechanism 140 includes folding protrusions configured to move between a nested or collapsed position as shown in FIG. 1B and an extended or open position. The folding protrusions of the interconnect mechanism 140 in the extended or open position may be coupled to reciprocal protrusions of other devices such as handle grips, mounts, clips, or like devices. The image capture apparatus 100 may include multiple interconnect mechanisms structured on, or forming a portion of, respective surfaces of the body 102. In some implementations, the interconnect mechanism 140 may be omitted.

As shown in FIG. 1B, the image capture apparatus 100 includes the display 142 structured on, and forming a portion of, a rear surface of the body 102. The display 142 outputs, such as presents or displays, such as by emitting visible light, data, such as to show image information such as image previews, live video capture, or status information such as battery life, camera mode, elapsed time, and the like. In some implementations, the display 142 may be an interactive display, which may receive, detect, or capture input, such as user input representing user interaction with the image capture apparatus 100. The image capture apparatus 100 may include multiple displays structured on respective surfaces of the body 102, such as the displays 108, 142 shown in FIGS. 1A-1B. In some implementations, the display 142 may be omitted or combined with another component of the image capture apparatus 100.

The image capture apparatus 100 may include features or components other than those described herein, such as other buttons or interface features. In some implementations, interchangeable lenses, cold shoes, and hot shoes, or a combination thereof, may be coupled to or combined with the image capture apparatus 100. For example, the image capture apparatus 100 may communicate with an external device, such as an external user interface device, via a wired or wireless computing communication link, such as via the data interface 124. The computing communication link may be a direct computing communication link or an indirect computing communication link, such as a link including another device or a network, such as the Internet. The image capture apparatus 100 may transmit images to the external device via the computing communication link.

The external device may store, process, display, or combination thereof, the images. The external user interface device may be a computing device, such as a smartphone, a tablet computer, a smart watch, a portable computer, personal computing device, or another device or combination of devices configured to receive user input, communicate information with the image capture apparatus 100 via the computing communication link, or receive user input and communicate information with the image capture apparatus 100 via the computing communication link. The external user interface device may implement or execute one or more applications to manage or control the image capture apparatus 100. For example, the external user interface device may include an application for controlling camera configuration, video acquisition, video display, or any other configurable or controllable aspect of the image capture apparatus 100. In some implementations, the external user interface device may generate and share, such as via a cloud-based or social media service, one or more images or video clips. In some implementations, the external user interface device may display unprocessed or minimally processed images or video captured by the image capture apparatus 100 contemporaneously with capturing the images or video by the image capture apparatus 100, such as for shot framing or live preview.

Figure 2A:
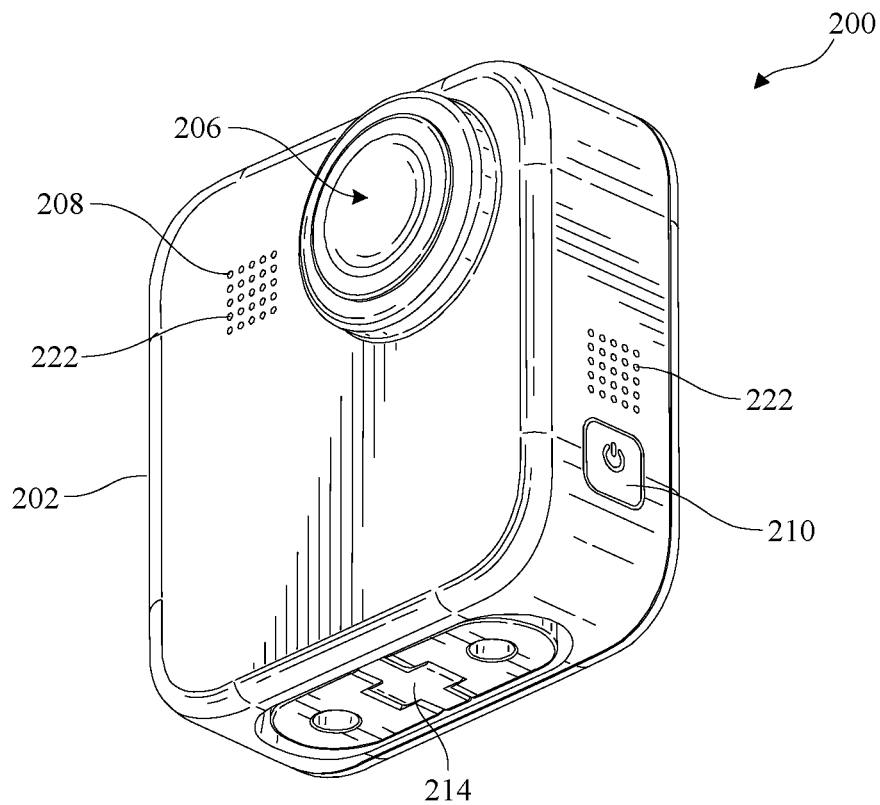
FIGS. 2A-B are isometric views of another example of an image capture apparatus.
Figure 2B:
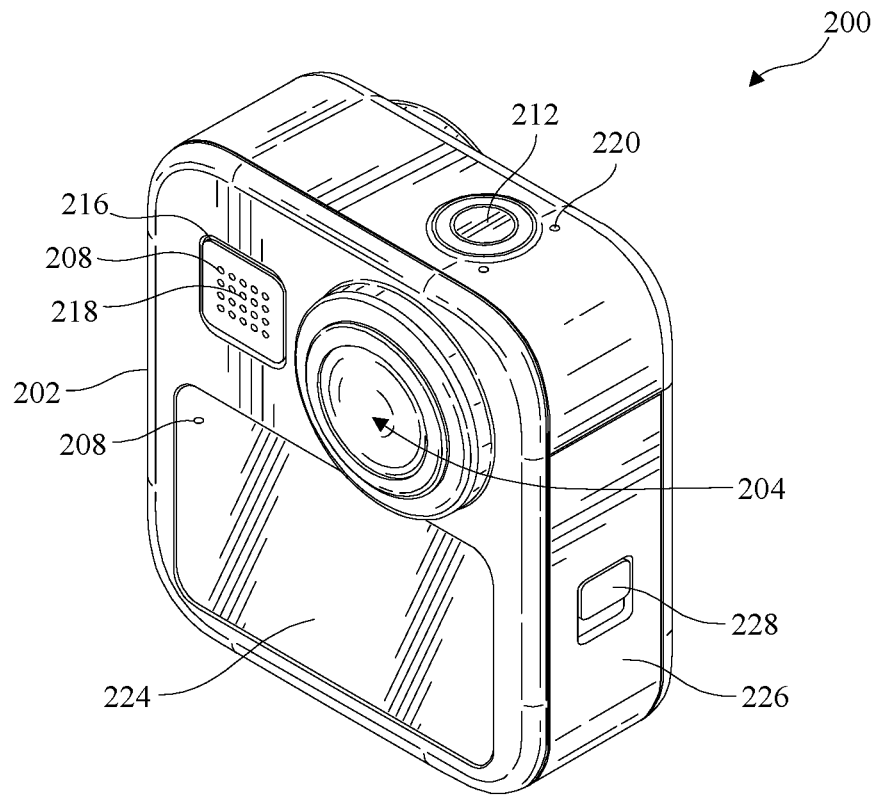

FIGS. 2A-2B illustrate another example of an image capture apparatus 200. The image capture apparatus 200 is similar to the image capture apparatus 100 shown in FIGS. 1A-1B. The image capture apparatus 200 includes a body 202, a first image capture device 204, a second image capture device 206, indicators 208, a mode button 210, a shutter button 212, an interconnect mechanism 214, a drainage channel 216, audio components 218, 220, 222, a display 224, and a door 226 including a release mechanism 228. The arrangement of the components of the image capture apparatus 200 shown in FIGS. 2A-2B is an example, other arrangements of elements may be used.

The body 202 of the image capture apparatus 200 may be similar to the body 102 shown in FIGS. 1A-1B. The first image capture device 204 is structured on a front surface of the body 202. The first image capture device 204 includes a first lens. The first image capture device 204 may be similar to the image capture device 104 shown in FIG. 1A. As shown in FIG. 2A, the image capture apparatus 200 includes the second image capture device 206 structured on a rear surface of the body 202. The second image capture device 206 includes a second lens. The second image capture device 206 may be similar to the image capture device 104 shown in FIG. 1A. The image capture devices 204, 206 are disposed on opposing surfaces of the body 202, for example, in a back-to-back configuration, Janus configuration, or offset Janus configuration. The image capture apparatus 200 may include other image capture devices structured on respective surfaces of the body 202.

As shown in FIG. 2B, the image capture apparatus 200 includes the indicators 208 associated with the audio component 218 and the display 224 on the front surface of the body 202. The indicators 208 may be similar to the indicator 106 shown in FIG. 1A. For example, one of the indicators 208 may indicate a status of the first image capture device 204 and another one of the indicators 208 may indicate a status of the second image capture device 206. Although two indicators 208 are shown in FIGS. 2A-2B, the image capture apparatus 200 may include other indictors structured on respective surfaces of the body 202.

As shown in FIGS. 2A-B, the image capture apparatus 200 includes input mechanisms including the mode button 210, structured on a side surface of the body 202, and the shutter button 212, structured on a top surface of the body 202. The mode button 210 may be similar to the mode button 110 shown in FIG. 1B. The shutter button 212 may be similar to the shutter button 112 shown in FIG. 1A.

The image capture apparatus 200 includes internal electronics (not expressly shown), such as imaging electronics, power electronics, and the like, internal to the body 202 for capturing images and performing other functions of the image capture apparatus 200. An example showing internal electronics is shown in FIG. 5.

As shown in FIGS. 2A-2B, the image capture apparatus 200 includes the interconnect mechanism 214 structured on a bottom surface of the body 202. The interconnect mechanism 214 may be similar to the interconnect mechanism 140 shown in FIG. 1B.

As shown in FIG. 2B, the image capture apparatus 200 includes the drainage channel 216 for draining liquid from audio components of the image capture apparatus 200.

As shown in FIGS. 2A-2B, the image capture apparatus 200 includes the audio components 218, 220, 222, respectively structured on respective surfaces of the body 202. The audio components 218, 220, 222 may be similar to the microphones 128, 130, 132 and the speaker 138 shown in FIGS. 1A-1B. One or more of the audio components 218, 220, 222 may be, or may include, audio sensors, such as microphones, to receive and record audio signals, such as voice commands or other audio, in conjunction with capturing images or video. One or more of the audio components 218, 220, 222 may be, or may include, an audio presentation component that may present, or play, audio, such as to provide notifications or alerts.

As shown in FIGS. 2A-2B, a first audio component 218 is located on a front surface of the body 202, a second audio component 220 is located on a top surface of the body 202, and a third audio component 222 is located on a back surface of the body 202. Other numbers and configurations for the audio components 218, 220, 222 may be used. For example, the audio component 218 may be a drain microphone surrounded by the drainage channel 216 and adjacent to one of the indicators 208 as shown in FIG. 2B.

As shown in FIG. 2B, the image capture apparatus 200 includes the display 224 structured on a front surface of the body 202. The display 224 may be similar to the displays 108, 142 shown in FIGS. 1A-1B. The display 224 may include an I/O interface. The display 224 may include one or more of the indicators 208. The display 224 may receive touch inputs. The display 224 may display image information during video capture. The display 224 may provide status information to a user, such as status information indicating battery power level, memory card capacity, time elapsed for a recorded video, etc. The image capture apparatus 200 may include multiple displays structured on respective surfaces of the body 202. In some implementations, the display 224 may be omitted or combined with another component of the image capture apparatus 200.

As shown in FIG. 2B, the image capture apparatus 200 includes the door 226 structured on, or forming a portion of, the side surface of the body 202. The door 226 may be similar to the door 114 shown in FIG. 1A. For example, the door 226 shown in FIG. 2A includes a release mechanism 228. The release mechanism 228 may include a latch, a button, or other mechanism configured to receive a user input that allows the door 226 to change position. The release mechanism 228 may be used to open the door 226 for a user to access a battery, a battery receptacle, an I/O interface, a memory card interface, etc.

In some embodiments, the image capture apparatus 200 may include features or components other than those described herein, some features or components described herein may be omitted, or some features or components described herein may be combined. For example, the image capture apparatus 200 may include additional interfaces or different interface features, interchangeable lenses, cold shoes, or hot shoes.

Figure 3:
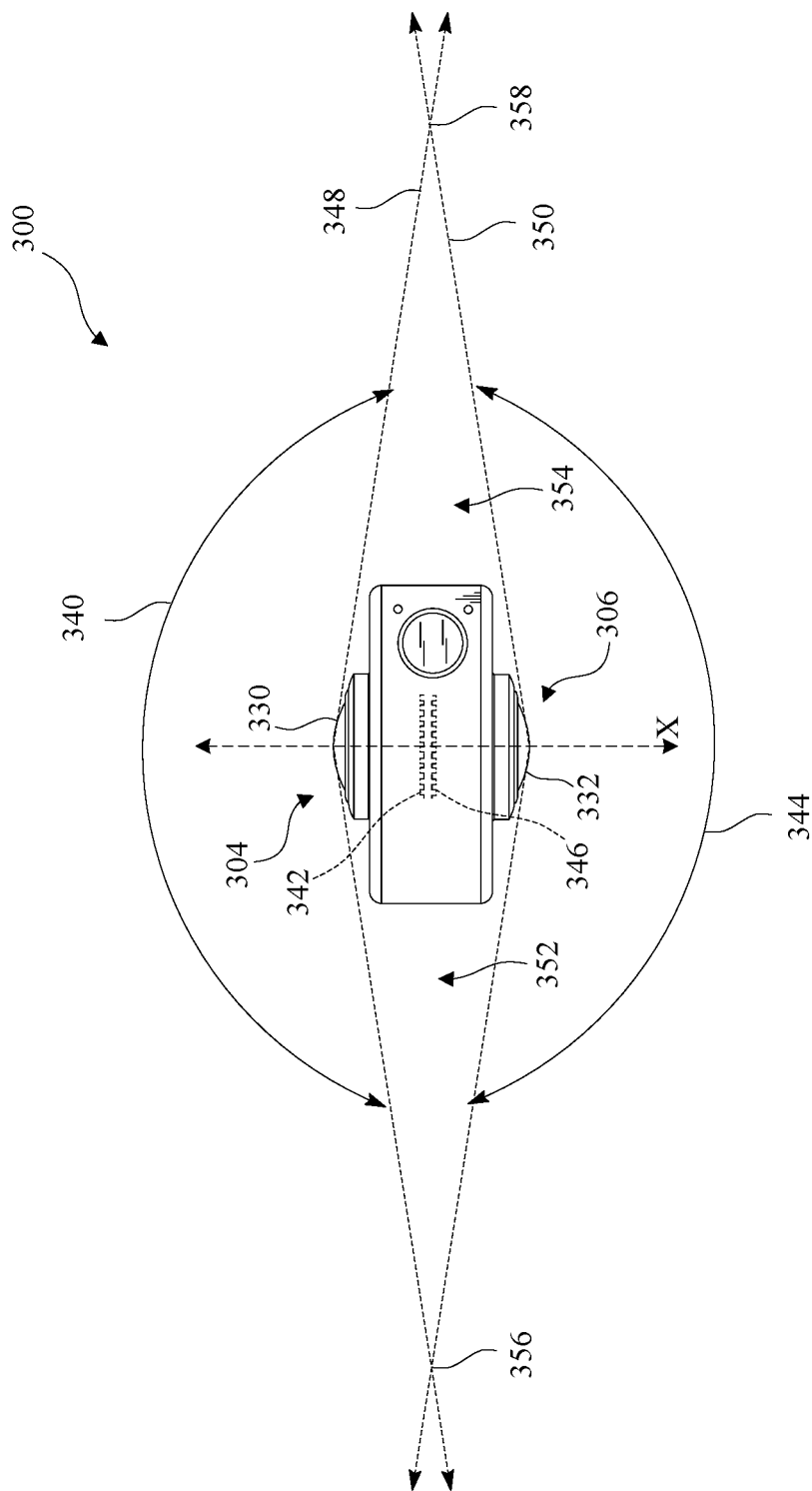
FIG. 3 is a top view of another example of an image capture apparatus.

FIG. 3 is a top view of an image capture apparatus 300. The image capture apparatus 300 is similar to the image capture apparatus 200 of FIGS. 2A-2B and is configured to capture spherical images.

As shown in FIG. 3, a first image capture device 304 includes a first lens 330 and a second image capture device 306 includes a second lens 332. For example, the first image capture device 304 may capture a first image, such as a first hemispheric, or hyper-hemispherical, image, the second image capture device 306 may capture a second image, such as a second hemispheric, or hyper-hemispherical, image, and the image capture apparatus 300 may generate a spherical image incorporating or combining the first image and the second image, which may be captured concurrently, or substantially concurrently.

The first image capture device 304 defines a first field-of-view 340 wherein the first lens 330 of the first image capture device 304 receives light. The first lens 330 directs the received light corresponding to the first field-of-view 340 onto a first image sensor 342 of the first image capture device 304. For example, the first image capture device 304 may include a first lens barrel (not expressly shown), extending from the first lens 330 to the first image sensor 342.

The second image capture device 306 defines a second field-of-view 344 wherein the second lens 332 receives light. The second lens 332 directs the received light corresponding to the second field-of-view 344 onto a second image sensor 346 of the second image capture device 306. For example, the second image capture device 306 may include a second lens barrel (not expressly shown), extending from the second lens 332 to the second image sensor 346.

A boundary 348 of the first field-of-view 340 is shown using broken directional lines. A boundary 350 of the second field-of-view 344 is shown using broken directional lines. As shown, the image capture devices 304, 306 are arranged in a back-to-back (Janus) configuration such that the lenses 330, 332 face in opposite directions, and such that the image capture apparatus 300 may capture spherical images. The first image sensor 342 captures a first hyper-hemispherical image plane from light entering the first lens 330. The second image sensor 346 captures a second hyper-hemispherical image plane from light entering the second lens 332.

As shown in FIG. 3, the fields-of-view 340, 344 partially overlap such that the combination of the fields-of-view 340, 344 forms a spherical field-of-view, except that one or more uncaptured areas 352, 354 may be outside of the fields-of-view 340, 344 of the lenses 330, 332. Light emanating from or passing through the uncaptured areas 352, 354, which may be proximal to the image capture apparatus 300, may be obscured from the lenses 330, 332 and the corresponding image sensors 342, 346, such that content corresponding to the uncaptured areas 352, 354 may be omitted from images captured by the image capture apparatus 300. In some implementations, the image capture devices 304, 306, or the lenses 330, 332 thereof, may be configured to minimize the uncaptured areas 352, 354.

Examples of points of transition, or overlap points, from the uncaptured areas 352, 354 to the overlapping portions of the fields-of-view 340, 344 are shown at 356, 358.

Images contemporaneously captured by the respective image sensors 342, 346 may be combined to form a combined image, such as a spherical image. Generating a combined image may include correlating the overlapping regions captured by the respective image sensors 342, 346, aligning the captured fields-of-view 340, 344, and stitching the images together to form a cohesive combined image. Stitching the images together may include correlating the overlap points 356, 358 with respective locations in corresponding images captured by the image sensors 342, 346.

Although a planar view of the fields-of-view 340, 344 is shown in FIG. 3, the fields-of-view 340, 344 are hyper-hemispherical.

A change in the alignment, such as position, tilt, or a combination thereof, of the image capture devices 304, 306, such as of the lenses 330, 332, the image sensors 342, 346, or both, may change the relative positions of the respective fields-of-view 340, 344, may change the locations of the overlap points 356, 358, such as with respect to images captured by the image sensors 342, 346, and may change the uncaptured areas 352, 354, which may include changing the uncaptured areas 352, 354 unequally.

Incomplete or inaccurate information indicating the alignment of the image capture devices 304, 306, such as the locations of the overlap points 356, 358, may decrease the accuracy, efficiency, or both of generating a combined image. In some implementations, the image capture apparatus 300 may maintain information indicating the location and orientation of the image capture devices 304, 306, such as of the lenses 330, 332, the image sensors 342, 346, or both, such that the fields-of-view 340, 344, the overlap points 356, 358, or both may be accurately determined, which may improve the accuracy, efficiency, or both of generating a combined image.

The lenses 330, 332 may be aligned along an axis X as shown, laterally offset from each other (not shown), off-center from a central axis of the image capture apparatus 300 (not shown), or laterally offset and off-center from the central axis (not shown). Whether through use of offset or through use of compact image capture devices 304, 306, a reduction in distance between the lenses 330, 332 along the axis X may improve the overlap in the fields-of-view 340, 344, such as by reducing the uncaptured areas 352, 354.

Images or frames captured by the image capture devices 304, 306 may be combined, merged, or stitched together to produce a combined image, such as a spherical or panoramic image, which may be an equirectangular planar image. In some implementations, generating a combined image may include use of techniques such as noise reduction, tone mapping, white balancing, or other image correction. In some implementations, pixels along a stitch boundary, which may correspond with the overlap points 356, 358, may be matched accurately to minimize boundary discontinuities.

Figure 4A:
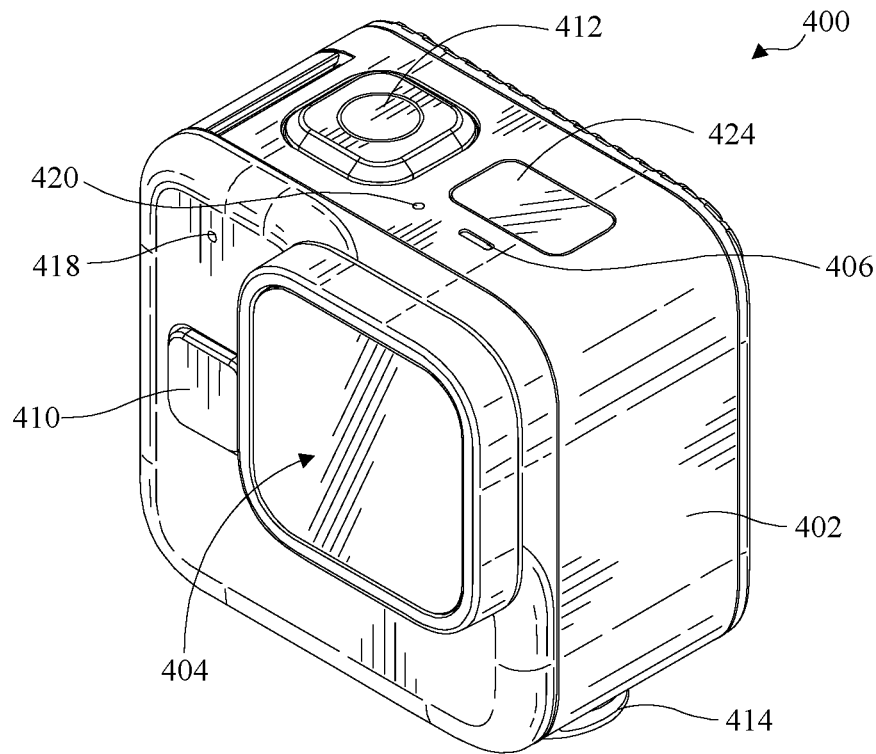
FIGS. 4A-B are isometric views of another example of an image capture apparatus.
Figure 4B:
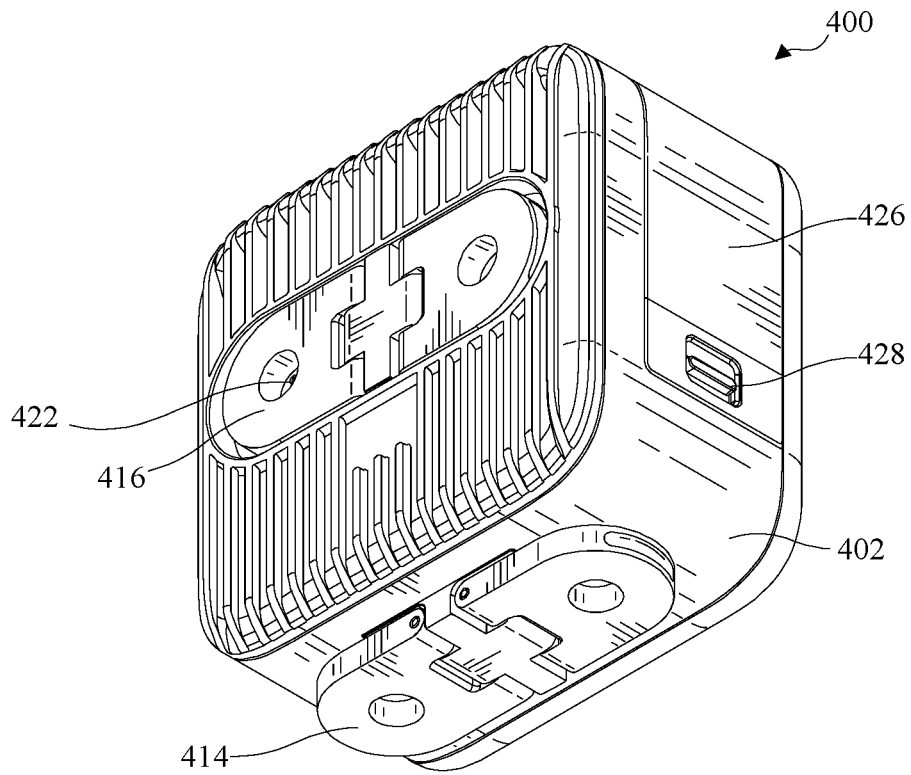

FIGS. 4A-4B illustrate another example of an image capture apparatus 400. The image capture apparatus 400 is similar to the image capture apparatus 100 shown in FIGS. 1A-1B and to the image capture apparatus 200 shown in FIGS. 2A-2B. The image capture apparatus 400 includes a body 402, an image capture device 404, an indicator 406, a mode button 410, a shutter button 412, interconnect mechanisms 414, 416, audio components 418, 420, 422, a display 424, and a door 426 including a release mechanism 428. The arrangement of the components of the image capture apparatus 400 shown in FIGS. 4A-4B is an example, other arrangements of elements may be used.

The body 402 of the image capture apparatus 400 may be similar to the body 102 shown in FIGS. 1A-1B. The image capture device 404 is structured on a front surface of the body 402. The image capture device 404 includes a lens and may be similar to the image capture device 104 shown in FIG. 1A.

As shown in FIG. 4A, the image capture apparatus 400 includes the indicator 406 on a top surface of the body 402. The indicator 406 may be similar to the indicator 106 shown in FIG. 1A. The indicator 406 may indicate a status of the image capture device 204. Although one indicator 406 is shown in FIGS. 4A, the image capture apparatus 400 may include other indictors structured on respective surfaces of the body 402.

As shown in FIGS. 4A, the image capture apparatus 400 includes input mechanisms including the mode button 410, structured on a front surface of the body 402, and the shutter button 412, structured on a top surface of the body 402. The mode button 410 may be similar to the mode button 110 shown in FIG. 1B. The shutter button 412 may be similar to the shutter button 112 shown in FIG. 1A.

The image capture apparatus 400 includes internal electronics (not expressly shown), such as imaging electronics, power electronics, and the like, internal to the body 402 for capturing images and performing other functions of the image capture apparatus 400. An example showing internal electronics is shown in FIG. 5.

As shown in FIGS. 4A-4B, the image capture apparatus 400 includes the interconnect mechanisms 414, 416, with a first interconnect mechanism 414 structured on a bottom surface of the body 402 and a second interconnect mechanism 416 disposed within a rear surface of the body 402. The interconnect mechanisms 414, 416 may be similar to the interconnect mechanism 140 shown in FIG. 1B and the interconnect mechanism 214 shown in FIG. 2A.

As shown in FIGS. 4A-4B, the image capture apparatus 400 includes the audio components 418, 420, 422 respectively structured on respective surfaces of the body 402. The audio components 418, 420, 422 may be similar to the microphones 128, 130, 132 and the speaker 138 shown in FIGS. 1A-1B. One or more of the audio components 418, 420, 422 may be, or may include, audio sensors, such as microphones, to receive and record audio signals, such as voice commands or other audio, in conjunction with capturing images or video. One or more of the audio components 418, 420, 422 may be, or may include, an audio presentation component that may present, or play, audio, such as to provide notifications or alerts.

As shown in FIGS. 4A-4B, a first audio component 418 is located on a front surface of the body 402, a second audio component 420 is located on a top surface of the body 402, and a third audio component 422 is located on a rear surface of the body 402. Other numbers and configurations for the audio components 418, 420, 422 may be used.

As shown in FIG. 4A, the image capture apparatus 400 includes the display 424 structured on a front surface of the body 402. The display 424 may be similar to the displays 108, 142 shown in FIGS. 1A-1B. The display 424 may include an I/O interface. The display 424 may receive touch inputs. The display 424 may display image information during video capture. The display 424 may provide status information to a user, such as status information indicating battery power level, memory card capacity, time elapsed for a recorded video, etc. The image capture apparatus 400 may include multiple displays structured on respective surfaces of the body 402. In some implementations, the display 424 may be omitted or combined with another component of the image capture apparatus 200.

As shown in FIG. 4B, the image capture apparatus 400 includes the door 426 structured on, or forming a portion of, the side surface of the body 402. The door 426 may be similar to the door 226 shown in FIG. 2B. The door 426 shown in FIG. 4B includes the release mechanism 428. The release mechanism 428 may include a latch, a button, or other mechanism configured to receive a user input that allows the door 426 to change position. The release mechanism 428 may be used to open the door 426 for a user to access a battery, a battery receptacle, an I/O interface, a memory card interface, etc.

In some embodiments, the image capture apparatus 400 may include features or components other than those described herein, some features or components described herein may be omitted, or some features or components described herein may be combined. For example, the image capture apparatus 400 may include additional interfaces or different interface features, interchangeable lenses, cold shoes, or hot shoes.

FIG. 5 is a block diagram of electronic components in an image capture apparatus 500. The image capture apparatus 500 may be a single-lens image capture device, a multi-lens image capture device, or variations thereof, including an image capture apparatus with multiple capabilities such as the use of interchangeable integrated sensor lens assemblies. Components, such as electronic components, of the image capture apparatus 100 shown in FIGS. 1A-B, the image capture apparatus 200 shown in FIGS. 2A-B, the image capture apparatus 300 shown in FIG. 3, or the image capture apparatus 400 shown in FIGS. 4A-4B, may be implemented as shown in FIG. 5.

The image capture apparatus 500 includes a body 502. The body 502 may be similar to the body 102 shown in FIGS. 1A-1B, the body 202 shown in FIGS. 2A-2B, or the body 402 shown in FIGS. 4A-4B. The body 502 includes electronic components such as capture components 510, processing components 520, data interface components 530, spatial sensors 540, power components 550, user interface components 560, and a bus 580.

The capture components 510 include an image sensor 512 for capturing images. Although one image sensor 512 is shown in FIG. 5, the capture components 510 may include multiple image sensors. The image sensor 512 may be similar to the image sensors 342, 346 shown in FIG. 3. The image sensor 512 may be, for example, a charge-coupled device (CCD) sensor, an active pixel sensor (APS), a complementary metal-oxide-semiconductor (CMOS) sensor, or an N-type metal-oxide-semiconductor (NMOS) sensor. The image sensor 512 detects light, such as within a defined spectrum, such as the visible light spectrum or the infrared spectrum, incident through a corresponding lens such as the first lens 330 with respect to the first image sensor 342 or the second lens 332 with respect to the second image sensor 346 as shown in FIG. 3. The image sensor 512 captures detected light as image data and conveys the captured image data as electrical signals (image signals or image data) to the other components of the image capture apparatus 500, such as to the processing components 520, such as via the bus 580.

The capture components 510 include a microphone 514 for capturing audio. Although one microphone 514 is shown in FIG. 5, the capture components 510 may include multiple microphones. The microphone 514 detects and captures, or records, sound, such as sound waves incident upon the microphone 514. The microphone 514 may detect, capture, or record sound in conjunction with capturing images by the image sensor 512. The microphone 514 may detect sound to receive audible commands to control the image capture apparatus 500. The microphone 514 may be similar to the microphones 128, 130, 132 shown in FIGS. 1A-1B, the audio components 218, 220, 222 shown in FIGS. 2A-2B, or the audio components 418, 420, 422 shown in FIGS. 4A-4B.

The processing components 520 perform image signal processing, such as filtering, tone mapping, or stitching, to generate, or obtain, processed images, or processed image data, based on image data obtained from the image sensor 512. The processing components 520 may include one or more processors having single or multiple processing cores. In some implementations, the processing components 520 may include, or may be, an application specific integrated circuit (ASIC) or a digital signal processor (DSP). For example, the processing components 520 may include a custom image signal processor. The processing components 520 conveys data, such as processed image data, with other components of the image capture apparatus 500 via the bus 580. In some implementations, the processing components 520 may include an encoder, such as an image or video encoder that may encode, decode, or both, the image data, such as for compression coding, transcoding, or a combination thereof.

Although not shown expressly in FIG. 5, the processing components 520 may include memory, such as a random-access memory (RAM) device, which may be non-transitory computer-readable memory. The memory of the processing components 520 may include executable instructions and data that can be accessed by the processing components 520.

The data interface components 530 communicates with other, such as external, electronic devices, such as a remote control, a smartphone, a tablet computer, a laptop computer, a desktop computer, or an external computer storage device. For example, the data interface components 530 may receive commands to operate the image capture apparatus 500. In another example, the data interface components 530 may transmit image data to transfer the image data to other electronic devices. The data interface components 530 may be configured for wired communication, wireless communication, or both. As shown, the data interface components 530 include an I/O interface 532, a wireless data interface 534, and a storage interface 536. In some implementations, one or more of the I/O interface 532, the wireless data interface 534, or the storage interface 536 may be omitted or combined.

The I/O interface 532 may send, receive, or both, wired electronic communications signals. For example, the I/O interface 532 may be a universal serial bus (USB) interface, such as USB type-C interface, a high-definition multimedia interface (HDMI), a FireWire interface, a digital video interface link, a display port interface link, a Video Electronics Standards Associated (VESA) digital display interface link, an Ethernet link, or a Thunderbolt link. Although one I/O interface 532 is shown in FIG. 5, the data interface components 530 include multiple I/O interfaces. The I/O interface 532 may be similar to the data interface 124 shown in FIG. 1B.

The wireless data interface 534 may send, receive, or both, wireless electronic communications signals. The wireless data interface 534 may be a Bluetooth interface, a ZigBee interface, a Wi-Fi interface, an infrared link, a cellular link, a near field communications (NFC) link, or an Advanced Network Technology interoperability (ANT+) link. Although one wireless data interface 534 is shown in FIG. 5, the data interface components 530 include multiple wireless data interfaces. The wireless data interface 534 may be similar to the data interface 124 shown in FIG. 1B.

The storage interface 536 may include a memory card connector, such as a memory card receptacle, configured to receive and operatively couple to a removable storage device, such as a memory card, and to transfer, such as read, write, or both, data between the image capture apparatus 500 and the memory card, such as for storing images, recorded audio, or both captured by the image capture apparatus 500 on the memory card. Although one storage interface 536 is shown in FIG. 5, the data interface components 530 include multiple storage interfaces. The storage interface 536 may be similar to the data interface 124 shown in FIG. 1B.

The spatial, or spatiotemporal, sensors 540 detect the spatial position, movement, or both, of the image capture apparatus 500. As shown in FIG. 5, the spatial sensors 540 include a position sensor 542, an accelerometer 544, and a gyroscope 546. The position sensor 542, which may be a global positioning system (GPS) sensor, may determine a geospatial position of the image capture apparatus 500, which may include obtaining, such as by receiving, temporal data, such as via a GPS signal. The accelerometer 544, which may be a three-axis accelerometer, may measure linear motion, linear acceleration, or both of the image capture apparatus 500. The gyroscope 546, which may be a three-axis gyroscope, may measure rotational motion, such as a rate of rotation, of the image capture apparatus 500. In some implementations, the spatial sensors 540 may include other types of spatial sensors. In some implementations, one or more of the position sensor 542, the accelerometer 544, and the gyroscope 546 may be omitted or combined.

The power components 550 distribute electrical power to the components of the image capture apparatus 500 for operating the image capture apparatus 500. As shown in FIG. 5, the power components 550 include a battery interface 552, a battery 554, and an external power interface 556 (ext. interface). The battery interface 552 (bat. interface) operatively couples to the battery 554, such as via conductive contacts to transfer power from the battery 554 to the other electronic components of the image capture apparatus 500. The battery interface 552 may be similar to the battery receptacle 126 shown in FIG. 1B. The external power interface 556 obtains or receives power from an external source, such as a wall plug or external battery, and distributes the power to the components of the image capture apparatus 500, which may include distributing power to the battery 554 via the battery interface 552 to charge the battery 554. Although one battery interface 552, one battery 554, and one external power interface 556 are shown in FIG. 5, any number of battery interfaces, batteries, and external power interfaces may be used. In some implementations, one or more of the battery interface 552, the battery 554, and the external power interface 556 may be omitted or combined. For example, in some implementations, the external interface 556 and the I/O interface 532 may be combined.

The user interface components 560 receive input, such as user input, from a user of the image capture apparatus 500, output, such as display or present, information to a user, or both receive input and output information, such as in accordance with user interaction with the image capture apparatus 500.

As shown in FIG. 5, the user interface components 560 include visual output components 562 to visually communicate information, such as to present captured images. As shown, the visual output components 562 include an indicator 564 and a display 566. The indicator 564 may be similar to the indicator 106 shown in FIG. 1A, the indicators 208 shown in FIGS. 2A-2B, or the indicator 406 shown in FIG. 4A. The display 566 may be similar to the display 108 shown in FIG. 1A, the display 142 shown in FIG. 1B, the display 224 shown in FIG. 2B, or the display 424 shown in FIG. 4A. Although the visual output components 562 are shown in FIG. 5 as including one indicator 564, the visual output components 562 may include multiple indicators. Although the visual output components 562 are shown in FIG. 5 as including one display 566, the visual output components 562 may include multiple displays. In some implementations, one or more of the indicator 564 or the display 566 may be omitted or combined.

As shown in FIG. 5, the user interface components 560 include a speaker 568. The speaker 568 may be similar to the speaker 138 shown in FIG. 1B, the audio components 218, 220, 222 shown in FIGS. 2A-2B, or the audio components 418, 420, 422 shown in FIGS. 4A-4B. Although one speaker 568 is shown in FIG. 5, the user interface components 560 may include multiple speakers. In some implementations, the speaker 568 may be omitted or combined with another component of the image capture apparatus 500, such as the microphone 514.

As shown in FIG. 5, the user interface components 560 include a physical input interface 570. The physical input interface 570 may be similar to the mode buttons 110, 210, 410 shown in FIGS. 1A, 2A, and 4A or the shutter buttons 112, 212, 412 shown in FIGS. 1A, 2B, and 4A. Although one physical input interface 570 is shown in FIG. 5, the user interface components 560 may include multiple physical input interfaces. In some implementations, the physical input interface 570 may be omitted or combined with another component of the image capture apparatus 500. The physical input interface 570 may be, for example, a button, a toggle, a switch, a dial, or a slider.

As shown in FIG. 5, the user interface components 560 include a broken line border box labeled "other" to indicate that components of the image capture apparatus 500 other than the components expressly shown as included in the user interface components 560 may be user interface components. For example, the microphone 514 may receive, or capture, and process audio signals to obtain input data, such as user input data corresponding to voice commands. In another example, the image sensor 512 may receive, or capture, and process image data to obtain input data, such as user input data corresponding to visible gesture commands. In another example, one or more of the spatial sensors 540, such as a combination of the accelerometer 544 and the gyroscope 546, may receive, or capture, and process motion data to obtain input data, such as user input data corresponding to motion gesture commands.

Figure 6A:
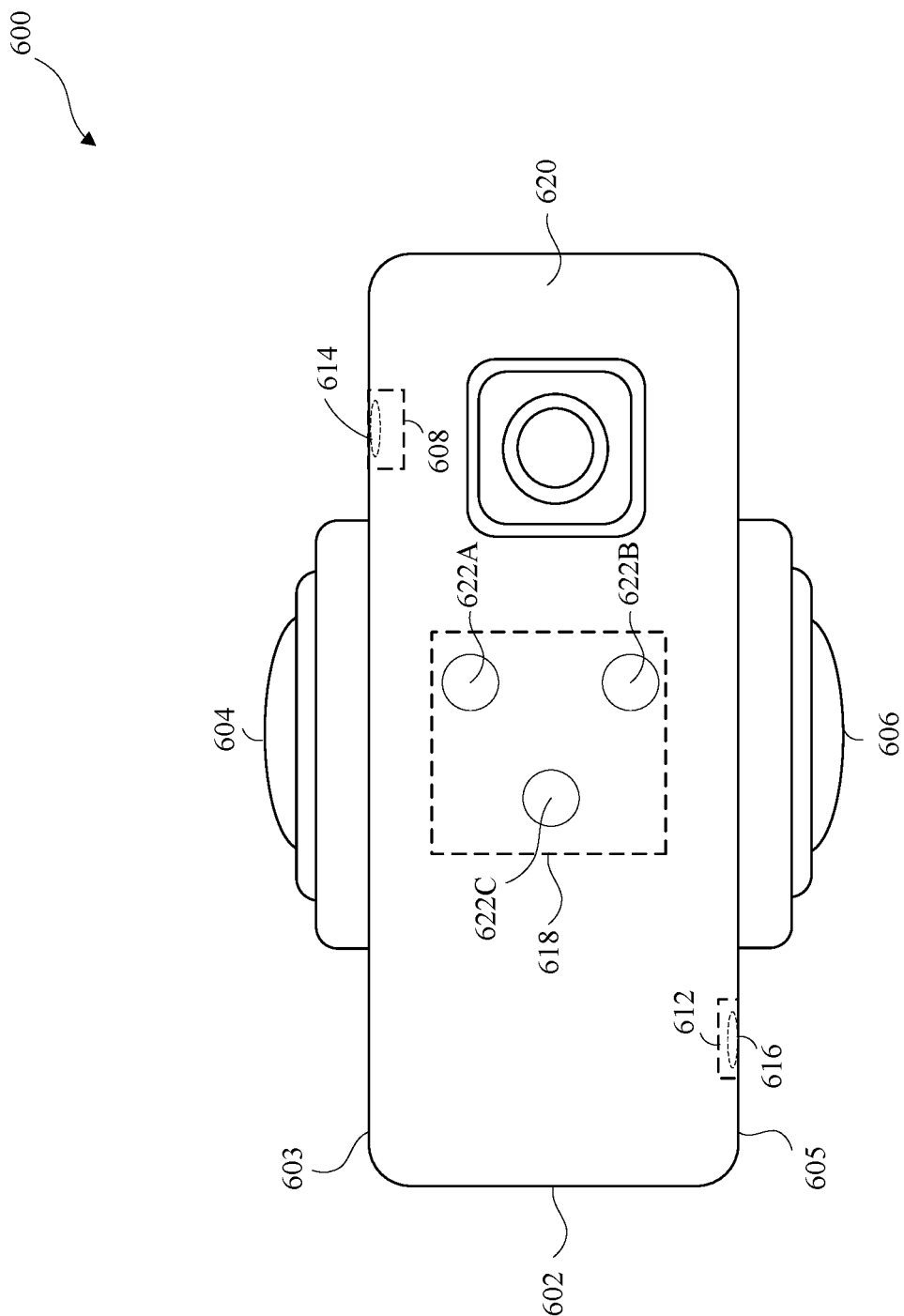
FIG. 6A is a diagram of an example of a top view of an image capture apparatus.

FIG. 6A is a diagram of an example of a top view of an image capture apparatus 600. The image capture apparatus 600 comprises a camera body 602 having two camera lenses 604, 606 structured on front and back surfaces 603, 605 of the camera body 602. The two lenses 604, 606 are oriented in opposite directions and couple with two images sensors mounted on circuit boards (not shown). Other electrical camera components (e.g., an image processor, camera SoC (system-on-chip), etc.) may also be included on one or more circuit boards within the camera body 602 of the image capture apparatus 600.

The lenses 604, 606 may be in a back-to-back configuration as shown, or laterally offset from each other, such that they are off-center from a central axis of the image capture apparatus 600, or such that they are laterally offset and off-center from the central axis. The image capture apparatus 600 includes a microphone array that comprises a front-facing component 608, a rear-facing component 612, and a top-facing component 618. The top-facing component 618 may be on any side of the image capture apparatus 600 that is perpendicular to the front-facing component 608 and the rear-facing component 612, such as on a top surface, a bottom surface, a left surface, a right surface, or any combination thereof. As shown in FIG. 6A, the front-facing component 608 is disposed on the front surface 603 of the image capture apparatus 600. The front-facing component 608 may include one or more microphone elements 614 shown in dashed line as hidden in the top view of FIG. 6A. In an example where there are multiple microphone elements 614, the microphone elements 614 may be configured such that they are distanced approximately 6 mm to 18 mm apart from each other. In an example, the microphone elements 614 may be spaced approximately 11.5 mm apart to improve low frequency directionality and to minimize white noise gain. The rear-facing component 612 is disposed on the back surface 605 of the image capture apparatus 600. The rear-facing component 612 may include one or more microphone elements 616 shown in dashed line as hidden in the top view of FIG. 6A. One or more of the microphone elements 616 may be configured as a drain microphone. The top-facing component 618 is shown on a top surface 620 of the image capture apparatus 600 in this example.

The top-facing component 618 may include one or more microphone elements 622A-C. The microphone elements 622A-C are arranged in an equilateral triangular configuration such that the internal angles of the equilateral triangle are each 60 degrees. The equilateral triangle configuration may be implemented to maximize the microphone spacing for stereo separation in the 120°±30° horizontal field-of-view range. The use of the equilateral triangle configuration provides for white noise gain that has fewer weak points due to a consistent microphone element spacing across any chosen beam direction. The microphone elements 622A-C may be configured such that they are distanced approximately 6 mm to 18 mm apart. The 6 mm to 18 mm spacing may determine the bandwidth of the output. For example, the larger the spacing, the lower the highest resolvable frequency. The spacing may be adjusted depending on the resolution required. In an example, the microphone elements 622A-C may be spaced approximately 11.5 mm apart to improve low frequency directionality and to minimize white noise gain, as white noise gain increases as microphone spacing decreases. When microphone pairs have different spacings, each microphone pair will have different white noise gain resulting in artifacts when combining beam formed signals. White noise gain discrepancies may therefore be minimized by maintaining consistent spacing between all microphone pairs. Placing the microphone elements 622A-C of the top surface 620 of the image capture apparatus 600 may correct for some acoustic shadowing that can be caused by the placement of these microphone elements on the front surface 603.

Figure 8:
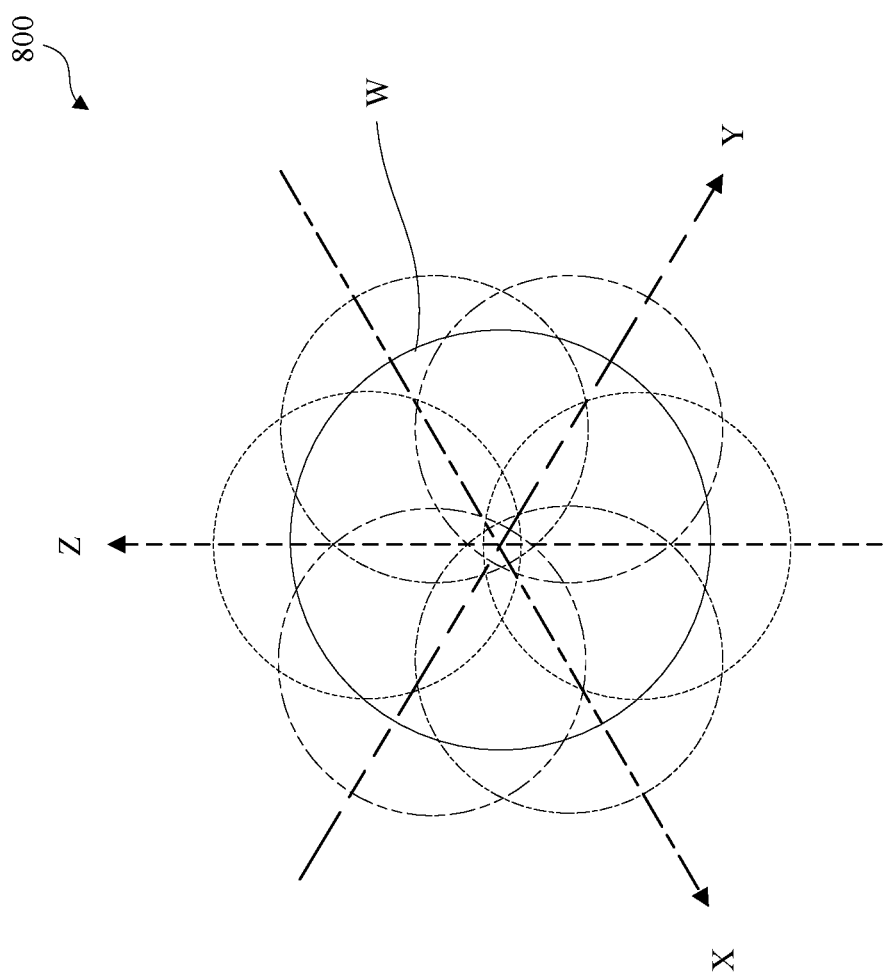
FIG. 8 is a diagram of an example of a First Order Ambisonics B format sensitivity plot.

The front-facing component 608, the microphone elements 614, the rear-facing component 612, and the microphone elements 616 are shown in broken lines as they may not be visible in this view. The front-facing component 608 and the top-facing component 618 of the microphone array may represent microphone elements on X, Y, Z axes to create X, Y, Z components of a First Order Ambisonics B-Format, as shown in FIG. 8. In some examples, the front-facing component 608, the rear-facing component 612, and the top-facing component 618 of the microphone array may represent microphone elements on X, Y, Z axes to create X, Y, Z components of the First Order Ambisonics B-Format, as shown in FIG. 8. These microphone elements may be oriented on a sphere or off-axis and may be transformed to the First Order Ambisonics B-Format.

Figure 6B:
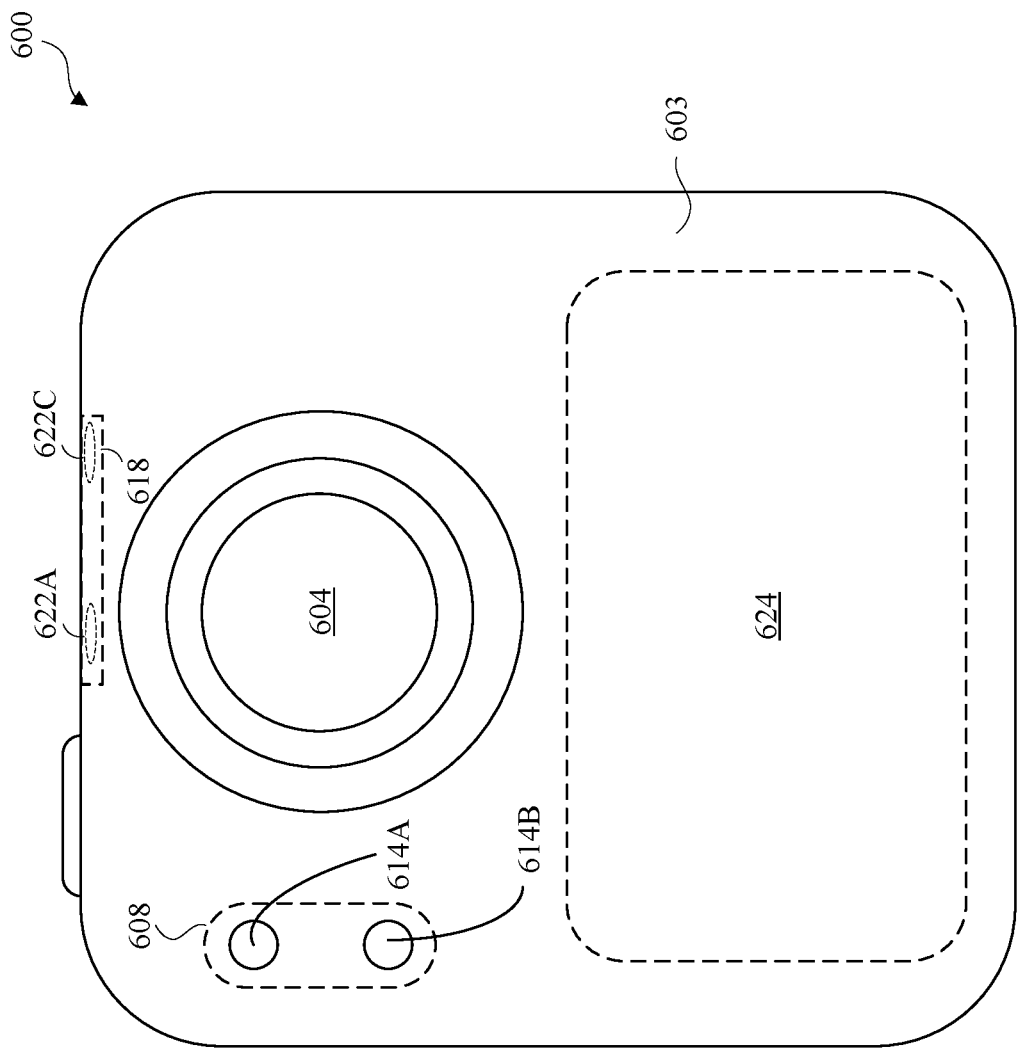
FIG. 6B is a diagram of an example of a front view of the image capture apparatus shown in FIG. 6A.

FIG. 6B is a diagram of an example of a front view of the image capture apparatus 600 shown in FIG. 6A. As shown in FIG. 6B, the front surface 603 of the image capture apparatus 600 comprises the camera lens 604 and the front-facing component 608. Although the front-facing component 608 may include any number of microphone elements, the example shown in FIG. 6B includes two microphone elements 614A and 614B in a vertical configuration. Each of the microphone elements 614A and 614B may be configured such that they are distanced approximately 6 mm to 18 mm apart. In an example, the microphone elements 614A and 614B may be spaced 11.5 mm apart to improve low frequency directionality and to minimize white noise gain. The top-facing component 618 and the microphone elements 622A and 622C are shown in broken lines as they may not be visible in this view. In some implementations, the image capture apparatus 600 may include a display 624 on the front surface 603, the display 624 is shown in dashed line as optional.

Figure 6C:
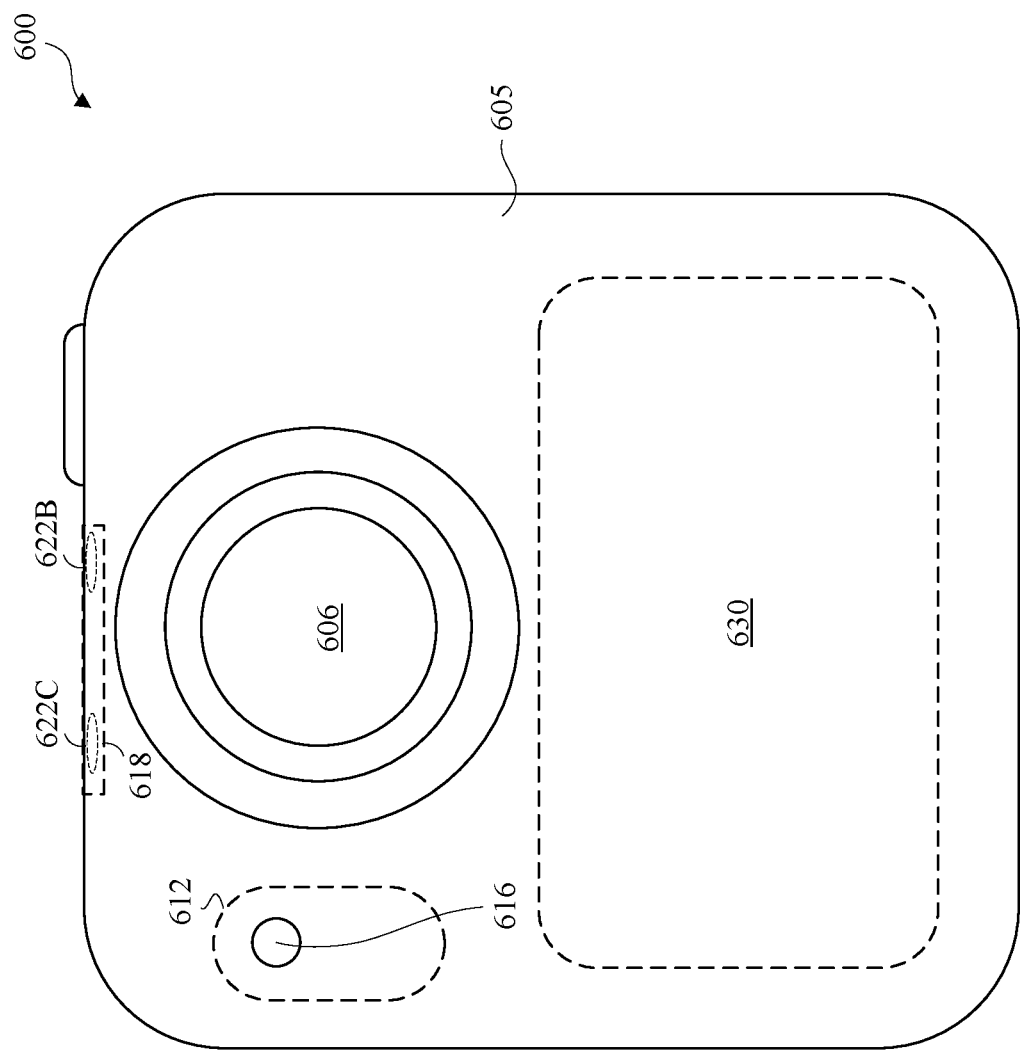
FIG. 6C is a diagram of an example of a rear view of the image capture apparatus shown in FIG. 6A.

FIG. 6C is a diagram of an example of a rear view of the image capture apparatus 600 shown in FIGS. 6A and 6B. As shown in FIG. 6C, the back surface 605 of the image capture apparatus 600 comprises the camera lens 606 and the rear-facing component 612. Although the rear-facing component 612 may include any number of microphone elements, the example shown in FIG. 6B includes one microphone element 616. In some implementations, the microphone element 616 may be a drain microphone. The top-facing component 618 and the microphone elements 622B and 622C are shown in broken lines as they may not be visible in this view. In some implementations, the image capture apparatus 600 may include a display 630 on the back surface 605. The display 630 is shown in dashed line as optional.

Figure 7A:
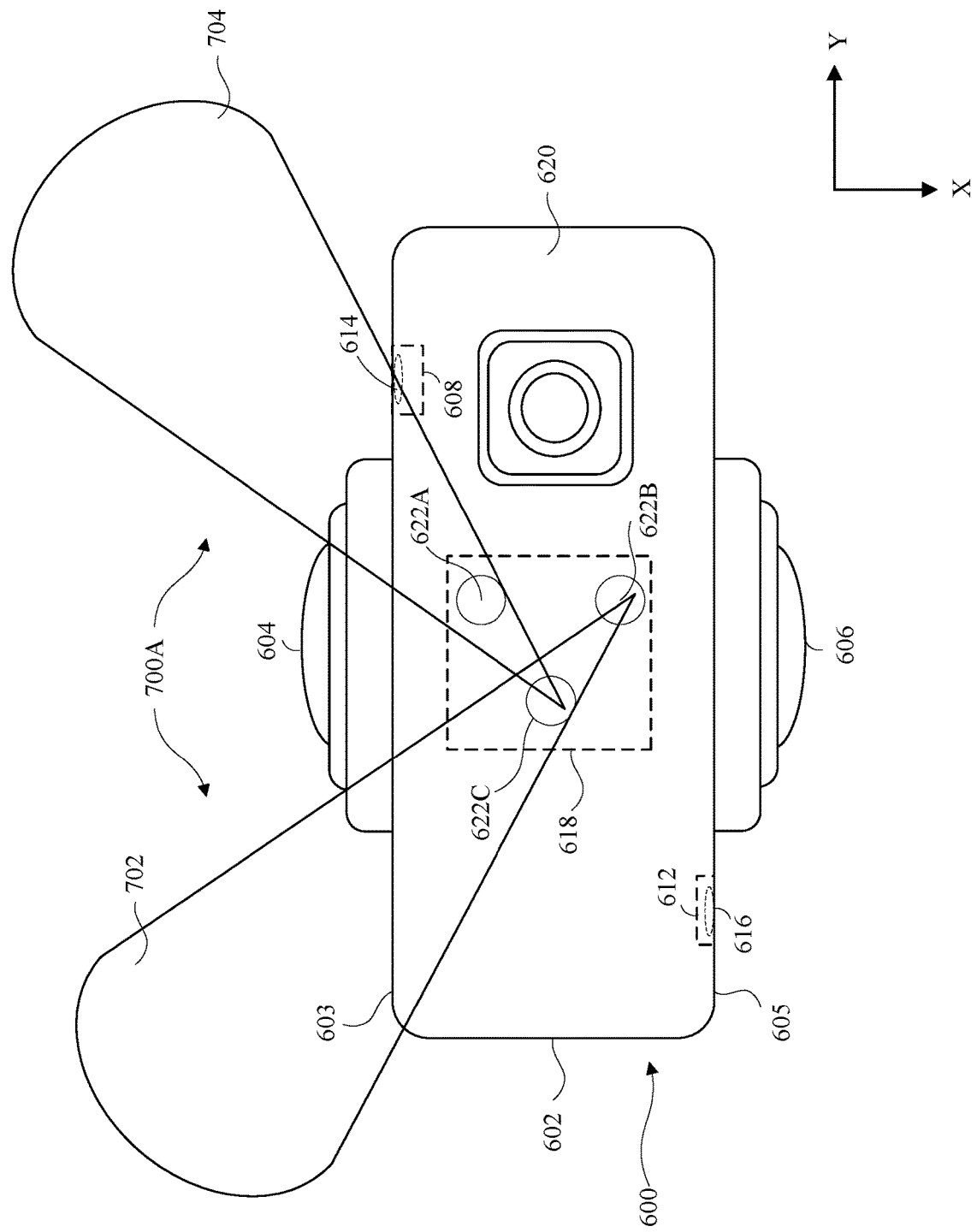
FIG. 7A is a diagram of an example of a stereo sound field using microphones on a top surface of an image capture apparatus.

FIG. 7A is a diagram of an example of a stereo sound field 700A using microphones on a top surface of an image capture apparatus. The configuration of the microphones as shown in FIG. 7A provides for improved low frequency directionality, minimizes white noise gain, and maximized channel matching by maintaining consistent spacing between all microphone pairs. In addition, the configuration of the microphones may reduce acoustic shadowing and/or diffraction when combining ambisonics channels. In this example, the top view of the image capture apparatus 600 of FIG. 6A is shown with the stereo sound field 700A. The stereo sound field 700A can be configured to be different widths (e.g., for stereo separation of field-of-view). Ambisonics channels for the X-axis and the Y-axis may be created using the microphone elements 622A-C of the top-facing component 618. In this example, the microphone elements 622B and 622C may be used to form a left channel 702 of the stereo sound field 700A and the microphone elements 622A and 622C may be used to form a right channel 704 of the stereo sound field 700A. In another example, the microphone elements 622A, 622B, and 622C may be used to create a left channel or a right channel.

Figure 7B:
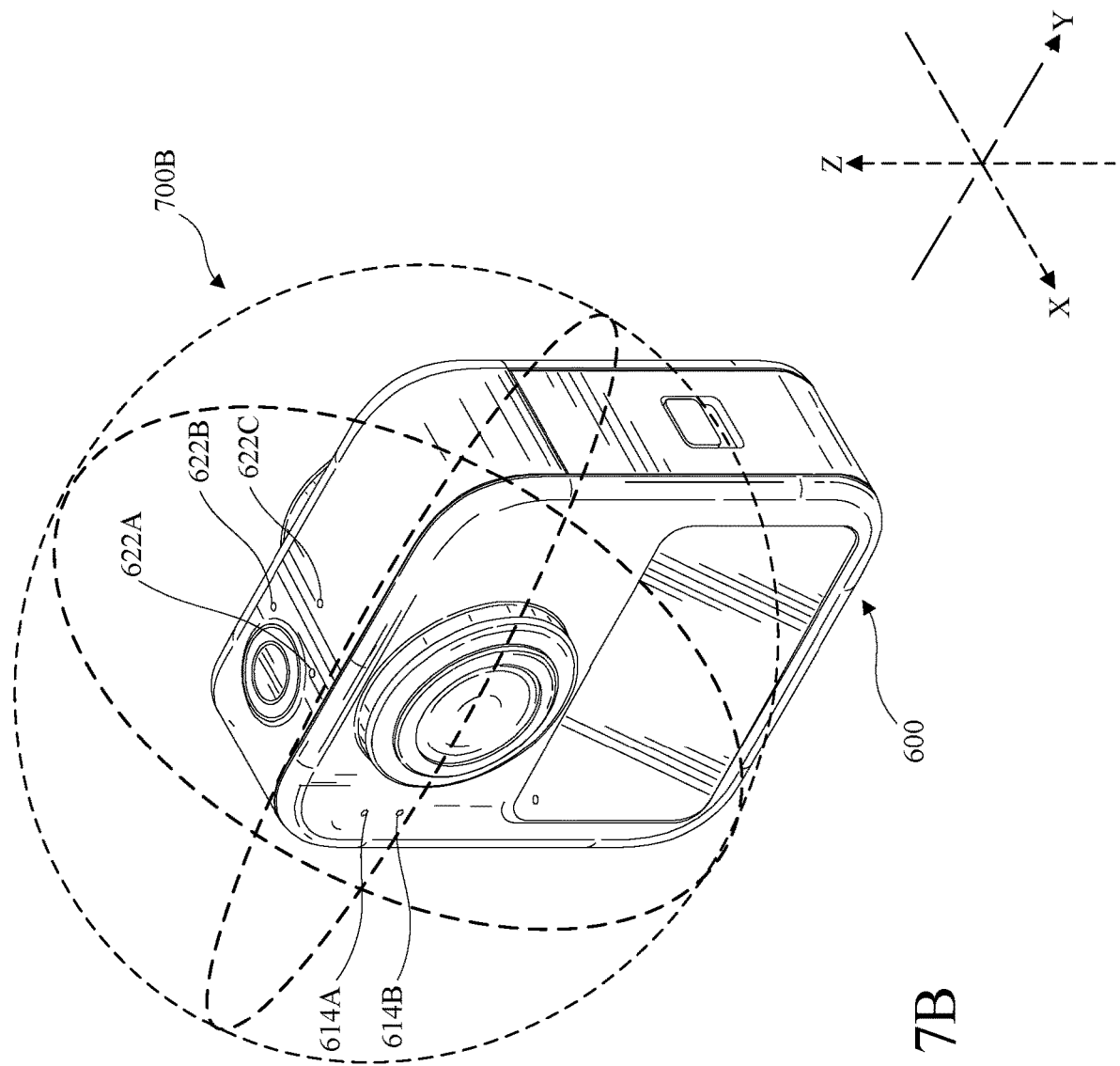
FIG. 7B is a diagram of an example of a 360-degree sound field using microphones on a front surface and a top surface of the image capture apparatus shown in FIG. 7A.

FIG. 7B is a diagram of an example of a 360-degree sound field 700B using microphones on a front surface and a top surface of the image capture apparatus shown in FIG. 7A. In this example, the microphone elements 622A-C of the image capture apparatus 600 may be used to create Ambisonics channels for the X-axis and the Y-axis of the 360-degree sound field 700B, and the microphone elements 614A and 614B may be used to create Ambisonics channels for the Z-axis of the 360-degree sound field 700B.

FIG. 8 is a diagram of an example of a First Order Ambisonics B format sensitivity plot 800. The sensitivity plot 800 is an example of a pickup pattern of virtual microphones that are created through the processing of the signals from all or some of the omnidirectional microphone elements. In an example, the sensitivity plot 800 may be created from directional microphones. The front-facing component 608, rear-facing component 612, and top-facing component 618 of the microphone array of FIG. 6A may be used to capture omnidirectional signals and transform the omnidirectional signals into a first order Ambisonics B-format. The first order Ambisonics B-format may include four signals corresponding to three figure-8 signals X, Y, Z and one mono signal W, as shown in FIG. 8. Each signal X, Y, and Z may represent a respective axis in a three-dimensional sound field such the sound field represented by the sensitivity plot 800.

The signals may be arranged into channels. For example, a W-channel may represent the mono sound pressure, an X-channel may represent a front-minus-back sound pressure gradient, a Y-channel may represent a left-minus-right sound pressure gradient, and a Z-channel may represent an up-minus-down sound pressure gradient. This four-channel format may represent the sensitivity plot 800.

Microphone elements such as microphone elements 614A-B and microphone elements 622A-C may be oriented in such a way that a pair of microphone elements reside on each of the X, Y, and Z axis. In an example, each pair of microphone elements may be used to create a figure-8 signal on each axis as shown in FIG. 8. The mono channel W may be created from a single microphone element or a sum of two or more microphone elements. In an example, a drain microphone may not be used for Ambisonics.

Figure 9:
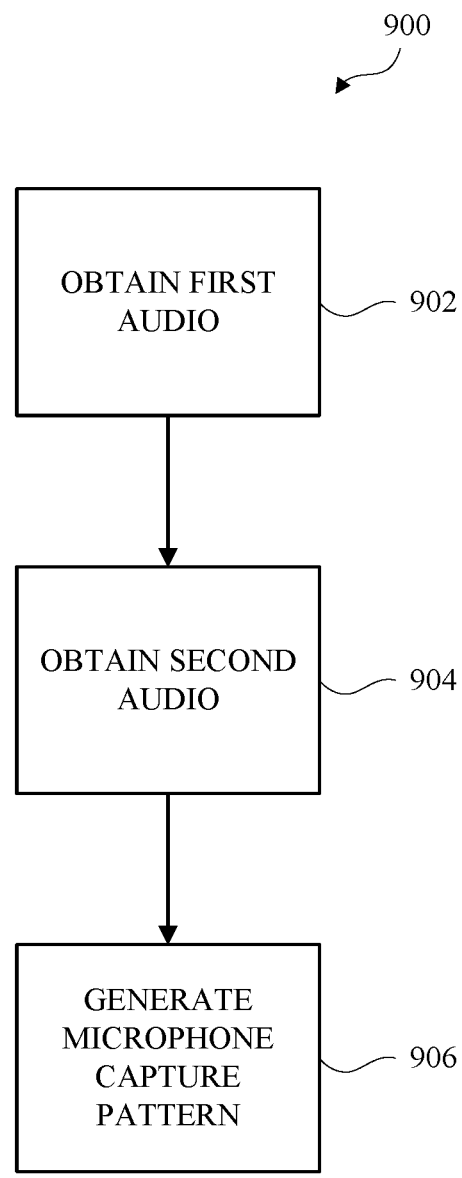
FIG. 9 is a diagram of an example of a method for generating microphone capture patterns.

FIG. 9 is a diagram of an example of a method 900 for generating microphone capture patterns. At 902, the method 900 includes obtaining first audio. The first audio is obtained via a first microphone facing a first direction. The first microphone is disposed on a first surface of a device, such as the image capture apparatus 600 shown in FIGS. 6A-C and 7A-B. The first microphone includes at least two microphone elements. The at least two microphone elements may be disposed on the first surface of the device in a vertical configuration.

At 904, the method 900 includes obtaining second audio. The second audio is obtained via a second microphone that is disposed on a second surface of the device. The second surface of the device is perpendicular to the first surface of the device. The second microphone includes three microphone elements that are disposed on the second surface of the device in an equilateral triangular configuration.

At 906, the method 900 includes generating a microphone capture pattern. A stereo microphone capture pattern may be generated using the second microphone. The stereo microphone capture pattern may be generated using a first microphone element and a second microphone element of the second microphone to produce a left channel, and the first microphone element and a third microphone element of the second microphone to produce a right channel.

A 360-degree microphone capture pattern can be generated using the first microphone and the second microphone. The 360-degree microphone capture pattern may be generated using the first microphone element and the second microphone element of the second microphone to produce a left channel associated with an X-axis and a Y-axis. The 360-degree microphone capture pattern may be generated using the first microphone element and the third microphone element of the second microphone to produce a right channel associated with the X-axis and the Y-axis. The 360-degree microphone capture pattern may be generated using the at least two microphone elements of the first microphone to produce a channel associated with a Z-axis.

In some embodiments, the method may include obtaining third audio. The third audio may be obtained via a third microphone facing a third direction that is perpendicular to the second direction. The third microphone may include at least one microphone element. The third microphone may be a drain microphone. A microphone capture pattern may be generated such that it is associated with a sound field of the first microphone, a sound field of the second microphone, a sound field of the third microphone, or any combination thereof. The configuration of the first microphone and the second microphone allows for the generation of microphone capture patterns with improved low frequency directionality, minimized white noise gain, and maximized channel matching. In addition, the configuration of the first microphone and the second microphone may reduce acoustic shadowing and/or diffraction when combining ambisonics channels.

The methods and techniques of dual-lens image capture device microphone positioning and audio capture described herein, or aspects thereof, may be implemented by an image capture apparatus, or one or more components thereof, such as the image capture apparatus 100 shown in FIGS. 1A-1B, the image capture apparatus 200 shown in FIGS. 2A-2B, the image capture apparatus 300 shown in FIG. 3, the image capture apparatus 400 shown in FIGS. 4A-4B, the image capture apparatus 500 shown in FIG. 5, or the image capture apparatus 600 shown in FIGS. 6A-C and 7A-7B. The methods and techniques of dual-lens image capture device microphone positioning and audio capture described herein, or aspects thereof, may be implemented by an image capture device, such as the image capture device 100 shown in FIGS. 1A-1B, the image capture device 200 shown in FIGS. 2A-2B, the image capture device 300 shown in FIG. 3, the image capture devices 400 shown in FIGS. 4A-4B, an image capture device of the image capture apparatus 500 shown in FIG. 5, the image capture apparatus 600 shown in FIGS. 6A-C and 7A-B.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An image capture apparatus, comprising:
   a first image sensor disposed on a first surface facing a first direction, the first image sensor having a first field-of-view (FOV) and configured to obtain first image data;
   a second image sensor disposed on a second surface facing a second direction that differs from the first direction, the second image sensor having a second FOV that partially overlaps with the first FOV and configured to obtain second image data;
   a microphone array comprising:
   a first microphone facing the first direction, the first microphone being disposed on a same side of the first surface as the first image sensor, wherein the first microphone includes two microphone elements disposed in a vertical configuration on the same side of the first surface relative to the first image sensor; and
   a second microphone facing a third direction that is perpendicular to the first and second directions, wherein the second microphone comprises a first microphone element, a second microphone element, and a third microphone element disposed in an equilateral triangular configuration; and
   a processor configured to:
   select, based on the first and second image data from the first and second image sensors, a microphone capture pattern corresponding to an overlap region of the first FOV and the second FOV; and
apply a spatial filtering algorithm that dynamically weights microphone signals based on a detected orientation of the image capture apparatus and the overlap region of the first FOV and the second FOV to generate a stereo microphone capture pattern using the second microphone.

2. The image capture apparatus of claim 1, wherein the stereo microphone capture pattern is generated using the first microphone element and the second microphone element to produce a left channel.

3. The image capture apparatus of claim 2, wherein the stereo microphone capture pattern is generated using the first microphone element and the third microphone element to produce a right channel.

4. The image capture apparatus of claim 1, further comprising:
a third microphone facing the second direction, wherein the third microphone comprises at least one microphone element, wherein the microphone capture pattern is associated with a sound field of the first microphone and the third microphone.

5. The image capture apparatus of claim 4, wherein the third microphone is a drain microphone.

6. The image capture apparatus of claim 1, further comprising:
a third microphone facing the second direction, wherein the third microphone comprises at least one microphone element, wherein the microphone capture pattern is associated with a sound field of the second microphone and the third microphone.

7. The image capture apparatus of claim 1, further comprising:
a third microphone facing the second direction, wherein the third microphone comprises at least one microphone element, wherein the microphone capture pattern is associated with a sound field of the first microphone, the second microphone, and the third microphone.

8. An image capture apparatus, comprising:
a first image sensor disposed on a first surface facing a first direction, the first image sensor having a first field-of-view (FOV) and configured to obtain first image data;
a second image sensor disposed on a second surface facing a second direction that differs from the first direction, the second image sensor having a second FOV that partially overlaps with the first FOV and configured to obtain second image data;
a microphone array comprising:
a first microphone facing the first direction, the first microphone being disposed on a same side of the first surface as the first image sensor, wherein the first microphone includes two microphone elements disposed in a vertical configuration on the same side of the first surface relative to the first image sensor; and
a second microphone facing a third direction that is perpendicular to the first and second directions, wherein the second microphone comprises a first microphone element, a second microphone element, and a third microphone element disposed in an equilateral triangular configuration; and
a processor configured to:
select, based on the first and second image data from the first and second image sensors, a microphone capture pattern corresponding to an overlap region of the first FOV and the second FOV; and
apply a spatial filtering algorithm that dynamically weights microphone signals based on a detected orientation of the image capture apparatus and the overlap region of the first FOV and the second FOV to generate a 360-degree microphone capture pattern using the first microphone and the second microphone.

9. The image capture apparatus of claim 8, wherein the 360-degree microphone capture pattern is generated using the first microphone element and the second microphone element to produce a left channel associated with an X-axis and a Y-axis.

10. The image capture apparatus of claim 9, wherein the 360-degree microphone capture pattern is generated using the first microphone element and the third microphone element to produce a right channel associated with the X-axis and the Y-axis.

11. The image capture apparatus of claim 10, wherein the 360-degree microphone capture pattern is generated using the two microphone elements of the first microphone to produce a channel associated with a Z-axis.

12. The image capture apparatus of claim 8, further comprising:
a third microphone facing the second direction, wherein the third microphone comprises at least one microphone element, wherein the microphone capture pattern is associated with a sound field of the first microphone and the third microphone.

13. The image capture apparatus of claim 12, wherein the third microphone is a drain microphone.

14. The image capture apparatus of claim 8, further comprising:
a third microphone facing the second direction, wherein the third microphone comprises at least one microphone element, wherein the microphone capture pattern is associated with a sound field of the second microphone and the third microphone.

15. The image capture apparatus of claim 8, further comprising:
a third microphone facing the second direction, wherein the third microphone comprises at least one microphone element, wherein the microphone capture pattern is associated with a sound field of the first microphone, the second microphone, and the third microphone.

16. A method comprising:
obtaining first audio via a first microphone facing a first direction, the first microphone being disposed on a first surface of a device, wherein the first microphone includes two microphone elements disposed in a vertical configuration on the first surface of the device;
obtaining second audio via a second microphone facing a second direction that is perpendicular to the first direction, wherein the second microphone comprises a first microphone element, a second microphone element, and a third microphone element disposed in an equilateral triangular configuration; and
generating a 360-degree microphone capture pattern using the first microphone and the second microphone, wherein generating the 360-degree microphone capture pattern comprises:
selecting a microphone capture pattern corresponding to a field-of-view (FOV) overlap region of image sensors; and
applying a spatial filtering algorithm that dynamically weights microphone signals based on a detected orientation of an apparatus and the overlap region of the image sensors.

17. The method of claim 16, wherein generating the 360-degree microphone capture pattern includes using the first microphone element and the second microphone element to produce a left channel associated with an X-axis and a Y-axis.

18. The method of claim 17, wherein generating the 360-degree microphone capture pattern includes using the first microphone element and the third microphone element to produce a right channel associated with the X-axis and the Y-axis.

19. The method of claim 18, wherein generating the 360-degree microphone capture pattern includes using the two microphone elements of the first microphone to produce a channel associated with a Z-axis.

20. The method of claim 16, further comprising:
   obtaining third audio via a third microphone facing a third direction that is perpendicular to the second direction, wherein the third microphone comprises at least one microphone element, and wherein the microphone capture pattern is associated with a sound field of the first microphone and the third microphone.

\* \* \* \* \*